(12) United States Patent
Malleth et al.

(10) Patent No.: US 8,185,672 B2
(45) Date of Patent: May 22, 2012

(54) TRANSMISSION OF DATA BURSTS ON A CONSTANT DATA RATE CHANNEL

(75) Inventors: Philippe Malleth, Saint Remy l'hornore (FR); Sebastien Tomas, Saint-Laurent-du-Var (FR); Mario Giani, Le Cannet (FR); Francois Badaud, Mouans Sartoux (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/014,753

(22) Filed: Jan. 27, 2011

(65) Prior Publication Data

US 2011/0125936 A1     May 26, 2011

(51) Int. Cl.
*G06F 13/28*     (2006.01)
(52) U.S. Cl. ................. 710/22; 710/24; 710/61
(58) Field of Classification Search .......... None
See application file for complete search history.

(56) References Cited

U.S. PATENT DOCUMENTS

| | | | |
|---|---|---|---|
| 6,070,212 A * | 5/2000 | Yasuda et al. ............ | 710/107 |
| 6,253,250 B1 * | 6/2001 | Evans et al. ............. | 709/253 |
| 2009/0262667 A1 * | 10/2009 | Kobayashi ............... | 370/254 |

FOREIGN PATENT DOCUMENTS

JP     2002185467 A *     6/2002

OTHER PUBLICATIONS

Anonymous, "Method for Direct Memory Access with an ATA HDD," Nov. 12, 2003, IP.com, pp. 1-4.*

"TMS320TCI6487 DSP Platform Product Bulletin", Texas Instruments Incorporated, pp. 1-4, 2006.
"TMS320C6474 DSP Antenna Interface User's Guide", Literature No. SPRUG 12, Texas Instruments Incorporated, pp. 1-288, Oct. 2008.
"TMS320C6474 DSP Enhanced DMA (EDMA3) Controller User's Guide", Literature No. SPRUG11A, Texas Instruments Incorporated, pp. 1-178, Oct. 2008, Revised Jan. 2010.
Christian F. Lanzani, "OBSAI RP3-01 6.144 GBPS Interface Implementation", FPGAworld, pp. 1-7, 2007.
Chunhua Hu and Jelena Nikolic-Popovic, "Transmission of Data Bursts on a Constant Data Rate Channel", U.S. Appl. No. 12/339,035, filed Dec. 18, 2008, pp. 1-20.

* cited by examiner

*Primary Examiner* — Eron J Sorrell
(74) *Attorney, Agent, or Firm* — Robert D. Marshall, Jr.; Wade James Brady, III; Frederick J. Telecky, Jr.

(57) ABSTRACT

A system and method for transmitting asynchronous data bursts over a constant data rate channel that transmits a continuous stream of data with virtually no load on the CPU(s) of the receiving processing node is disclosed. The data channel has a defined frame structure with one or more data structures, wherein each data structure comprises a plurality of data locations. A receiver selects data from a fixed data location in each data structure as a data descriptor for each respective data structure. The receiver configures a direct memory access (DMA) function using each data descriptor. For each data structure, a block of payload data is transferred from the data channel to a memory buffer using the DMA function when the data descriptor associated with the data structure is an eligible data descriptor that indicates the block of payload data is present, otherwise a dummy DMA transfer is performed when the data descriptor is an ineligible data descriptor that indicates no payload data is present in the associated data structure.

11 Claims, 8 Drawing Sheets

TRANSMISSION OF DATA BURSTS ON A CONSTANT DATA RATE CHANNEL

CLAIM OF PRIORITY UNDER 35 U.S.C. 119(A)

The present application claims priority to and incorporates by reference European Patent application number EP11290017, filed Jan. 14, 2011, entitled "Transmission of Data Bursts on a Constant Data Rate Channel."

FIELD OF THE INVENTION

This invention generally relates to transmission of asynchronous data via a channel that is not designed to handle asynchronous data.

BACKGROUND OF THE INVENTION

Digital systems are generally constructed by interconnecting generic and specialized integrated circuits that often include one or more digital computer processors. Software is developed for execution by the processors for controlling the system. For example, wireless cellular communication networks have a base station located in each cell of the network. A base station consists of a baseband processing subsystem and a radio transceiver.

The baseband processing subsystem of a base station's electronics is typically constructed using standardized integrated circuits that include processors, memory and various communication interface circuits. The base station requires high bandwidth transmission paths between the baseband processing subsystem and the radio transceivers. For this reason, standardized parts have been developed that include several high speed channels for transferring antenna I-Q (in-phase and quadrature) data via constant data rate channels.

Working groups referred to as Open Base Station Architecture Initiative (OBSAI) or Common Public Radio Interface (CPRI™) have promulgated several standards with a goal to create an open market for base station components.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

In this disclosure, a protocol is described that allows bursty, asynchronous blocks of data to be transferred over a high speed synchronous channel such as an antenna interface channel conforming to OBSAI standards. A transmitter periodically places a data descriptor into the synchronous channel in fixed, known locations in the data stream. A receiver then configures a DMA channel to repeatedly transfer each data descriptor from the known locations in the data stream to a parameter storage location. A second DMA channel is chained to the first DMA channel and then uses each data descriptor from the parameter storage location to configure DMA transfers to transfer payload data associated with each data descriptor from the data channel to a memory buffer. When no payload data is available, the transmitter inserts a series of null data descriptors that indicates no data is available and the second DMA channel performs a null transfer in response to each null data descriptor. When an asynchronous burst of data is available, the transmitter inserts non-null data descriptors that the second DMA then uses to transfer payload data associated with each data descriptor from the data channel to a memory buffer. When the last non-null data descriptor is received, a processor on the receiver may be notified to indicate a data burst has arrived. In this manner, asynchronous bursts of data may be transmitted over a synchronous data channel without requiring a processor at the receiver to continuously poll for incoming data.

Figure 1:
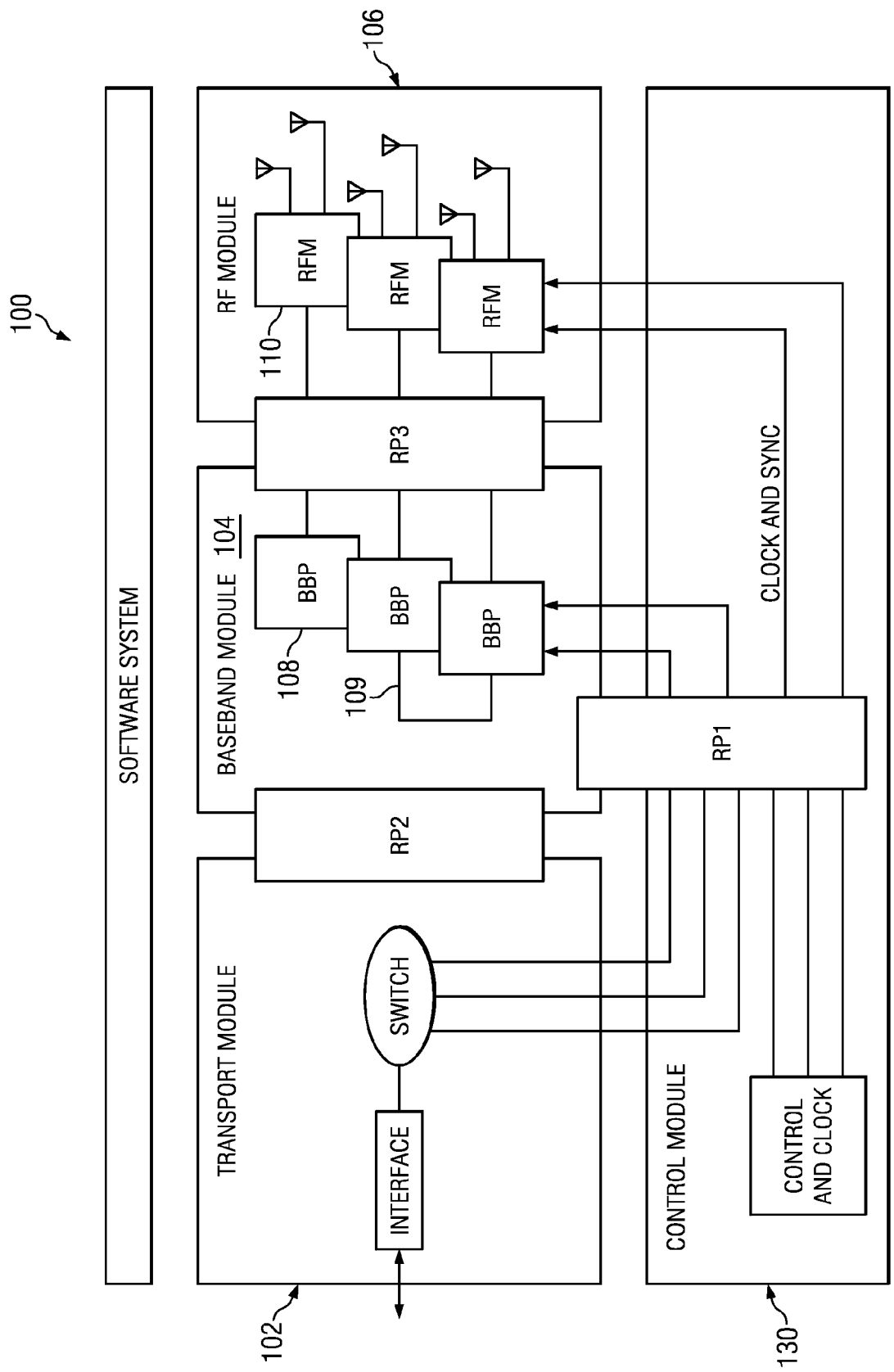
FIG. 1 is a pictorial of an illustrative base station that employs an embodiment of data bursts being transmitted via constant data rate channels.

FIG. 1 shows an exemplary base station 100 for use in a telecommunications network. Wireless cellular communication networks incorporate a number of mobile UEs (user equipment) and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable. Each base station 100 in a network is operable over coverage area which may be further divided into cells. Handsets or other user equipment are located within or pass through the various cells of the network. Base station 100 transmits to and receives transmissions from UE within its cell via downlink and uplink transmissions. As a UE moves out of one cell and into another cell, it may be handed over to a different base station serving the next cell. A UE in a cell may be stationary such as within a home or office, or may be moving while a user is walking or riding in a vehicle.

Base station transceiver system 100 is composed of four main components. Radio module 106 receives signals coming from portable devices and down converts it to digital data. Processing module 104 then takes the encoded signal and brings it back to baseband before it is transmitted to the terrestrial network via transport module 102. Coordination between these three functions is maintained by control module 130.

The key objective of OBSAI is to create an open market for BTS components by defining standard interfaces used to connect the four modules described above. In the OBSAI specification, interfaces between modules are known as reference points (RPs). As illustrated in FIG. 1, RP1 is the interface that allows communication between a control module and the other three modules. RP2 provides a link between the transport and baseband modules, while RP3 connects the baseband and radio frequency (RF) modules, also referred to as antenna data, or an antenna interface.

Each baseband processing subsystem, generally indicated at 108, of base station 100 is constructed using a number of specialized processing systems on a chip (SOC) integrated circuits (IC) which each contain multiple processor cores and communication ports, among other things. Radio frequency modules, generally indicated at 110, that transmit and receive the downlink and uplink radio signals are connected to these processors via high bandwidth constant data rate RP3 links for transferring the streams of antenna data.

Typically, the specialized processing SOC has a number of high speed channels designed to handle the antenna stream data thus enabling the SOC to directly connect to the radio subsystem without any further chips. The processing SOC will typically have other types of communication ports also, such as Ethernet and various types of serial ports. However, frequently there is a need to provide more interconnection capability than there are communication ports available on the processing SOC. An efficient method for performing burst data transfers between two or more processing SOC's using one or more of the high speed antenna stream channels, as indicated at 109, will be described in more detail below. In one embodiment, other ports like Ethernet and SRIO are used to communicate to other chips like host processors and coprocessors. At the same time, the antenna interface might not be used to directly connect to the radio subsystem—instead, the SOC would interface to another specialized coprocessor which would in turn interface to the radio subsystem. In this case, the antenna interface is under-utilized and could therefore provide additional bandwidth needed for packet communication among SOCs, as indicated at 109.

Figure 2:
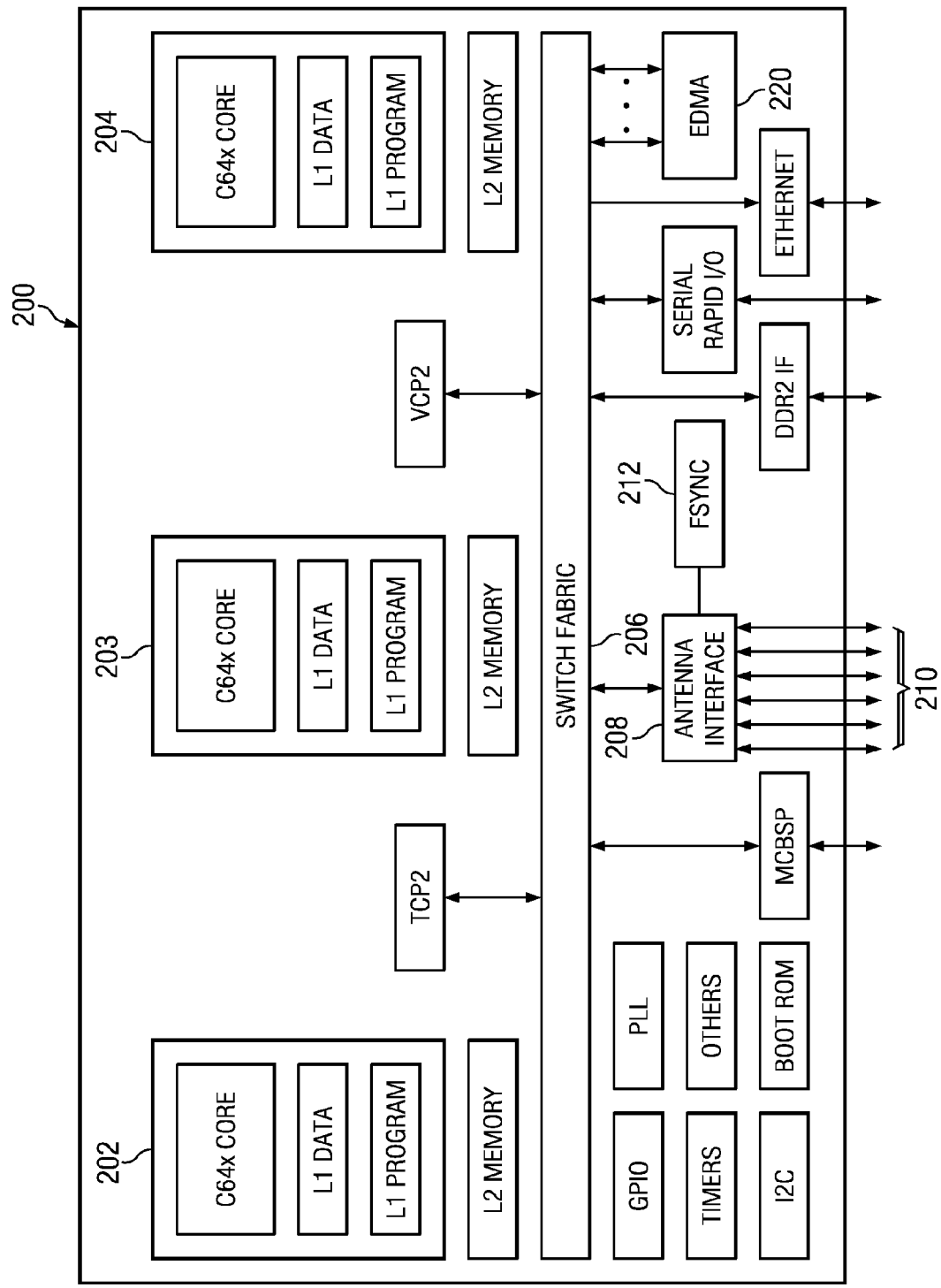
FIG. 2 is a block diagram of an exemplary system on a chip that includes a number of high speed constant data rate channels that may be used for data burst transfers.

FIG. 2 is a block diagram of an exemplary processing SOC 200 that is used to implement each baseband processing unit 108 of FIG. 1. SOC 200 includes a number of synchronous high speed constant data rate channels 210 that are intended for transporting antenna data. For purposes of description, the processing system of FIG. 2 is a Texas Instruments TMS320C6474 (C6474) Digital Signal Processing (DSP) platform. The C6474 device is a very high-performance DSP designed specifically for wireless infrastructure baseband applications. With a high level of functional integration and a high channel density supported on a single device, the C6474 DSP offers a modular and scalable design with a small footprint and is therefore an ideal solution for pico, micro and macro BTS and enables an SOC baseband solution for UMTS, TDSCDMA, WiMAX and cdma2000 applications.

SOC 200 has three independent DSP subsystems 202-204. At the heart of each subsystem is a 1.0-GHz C64x+ DSP core. For flexibility, the 3 Mbytes of L2 SRAM/cache can be configured in multiple ways, such as 1/1/1 Mbytes, or 1.5/1/0.5 Mbytes, among the three DSP cores. To support wireless applications, the DSP contains a number of specialized coprocessors: Viterbi Decoder Coprocessor (VCP2); Turbo Code Decoder Coprocessor (TCP2). Another feature of the device is its support of standard interfaces such as: serial RapidIO (SRIO), Gigabit Ethernet, double data rate (DDR2) memory interface, and a multi-channel buffered serial port (McBSP). A switch-fabric 206 with enhanced direct memory access (EDMA) engine 220 supports high-bandwidth, low-latency internal communications. DMA 220 manages communications between peripherals, memories, accelerators and DSP cores within SOC 200.

An antenna interface (AIF) 208 is a CPRI (Common Public Radio Interface) and OBSAI-compliant (Open Base Station Architecture Initiative) peripheral whose primary purpose is to transfer baseband antenna samples, via a high-speed serializer/deserializer (SerDes) interface, between a radio sub-system and a baseband sub-system in cellular infrastructure applications. AIF 208 supports up to six configurable links 210 each at a maximum rate of 3.072 Gbps (OBSAI) and 2.4576 Gbps (CPRI).

Figure 3:
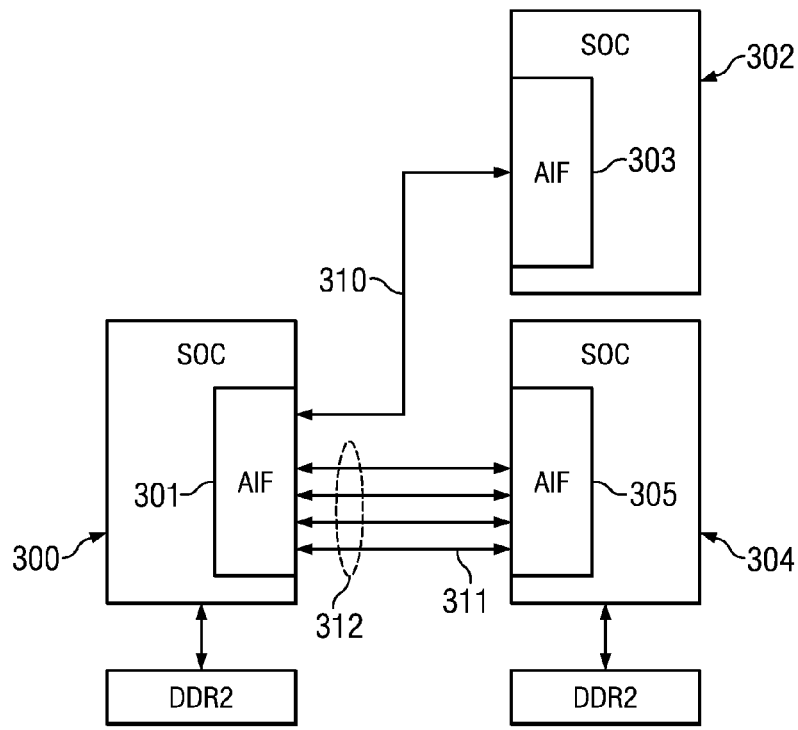
FIG. 3 is a block diagram of a non-base station system that employs an embodiment of data bursts being transmitted via constant data rate channels.

FIG. 3 is a block diagram of a system that employs an embodiment of data bursts being transmitted via constant data rate channels 310, 312. Synchronous data channels 310, 312 are the same or similar to synchronous channels 210 and are driven and received by antenna interface modules 301, 302, 303 that are the same or similar to AIF 208. In this embodiment, synchronous data channels 310, 312 conform to OBSAI RP3 protocols. In this example, each processing node SOC 300, 302, 304 is the same or similar to SOC 200. However, in other embodiments of the invention, processing nodes may be implemented using various combinations of processor, peripherals and memories. Similarly, synchronous data channels that support synchronous protocols other than OBSAI RP3 may be used in other embodiments of the invention.

In various embodiments, two or more SOC 300, 302, 304, etc. may be interconnected and need to transfer data and/or control information between them. A typical embodiment may be a base station, as illustrated in FIG. 1. However, other embodiments may be for non-base station applications, such as medical, defense, vision, etc., where large amounts of data need to be transferred between two or more processing nodes, such as SOC 302, 304, 306. It may be advantageous to use one or more of the antenna stream links 310, 312 for this purpose. However, the standard AIF 301, 303, 305 operation is continuously transmitting and receiving data and the timing is strictly controlled by hardware according to the OBSAI standards. The nature of inter-processor data traffic for various embodiments of the invention, however, is often asynchronous and bursty, rather than continuous. This type of traffic is best suited for a packet interface like gigabit Ethernet or sRIO, but in some applications, these interfaces are already used for other purposes, or, do not offer enough bandwidth neither offers flexible and large packet sizes.

Given the continuous, synchronous nature of the AIF links 310, 312, the easiest approach to implement bursty traffic would be to have the AIF transmitter 301, for example, continuously send dummy data, and insert useful data when there is actually something to send. The receiving SOC 302, for example, would have to periodically check if there is any data available. Given the data rates involved, the polling at receiver 302 could represent a very high load on the DSP (both the CPU and the internal buses) within SOC 302.

In this disclosure, a protocol designed to remove the above mentioned polling overhead at a receiver is described. Rather than having to poll periodically looking for useful data, a transmitter periodically places a data descriptor within the data burst in fixed, known locations. A receiver then configures a DMA channel to repeatedly transfer each data descriptor from the known locations in the data channel to a parameter storage location. A second DMA channel is chained to the first DMA channel and then uses each data descriptor from the parameter storage location to configure DMA transfers to transfer payload data associated with each data descriptor from the data channel to a memory buffer. When no payload data is available, the transmitter inserts a series of ineligible data descriptors that indicates no data is available and the second DMA channel performs a null transfer in response to each ineligible data descriptor. When an asynchronous burst of data is available, the transmitter inserts eligible data descriptors that the second DMA then uses to transfer payload data associated with each data descriptor from the data channel to a memory buffer. When the last eligible data descriptor of a data burst is received, a processor on the receiver may be notified to indicate a data burst has arrived. In this manner, asynchronous bursts of data may be transmitted over a synchronous data channel without requiring a processor at the receiver to continuously poll for incoming data.

When used for transferring antenna data, once the antenna interface is up and running, data samples are continuously transmitted and received. The AIF peripheral mainly provides buffering capabilities so that no data would be lost. These buffers need to be filled and emptied at a certain rate in order to prevent overflow (losing data) and underflow (reading stale data). The data (typically antenna samples) can consist of multiple streams (or channels, or antenna containers) which are combined on a single physical link in a TDM (time-division multiplexing) manner. In addition to antenna samples, control channels are also supported in the OBSAI interface and are time-division multiplexed with antenna streams in specific reserved locations. The OBSAI protocol defines important timing information which guarantees that the transmitter and the receiver are synchronized. Various timing events which are needed for the AIF are generated by the FSYNC module 212 based on an external clock.

Operation of AIF 208 and the OBSAI frame structure is described in detail in "TMS320C6474 Antenna Interface User's Guide, Literature Number: SPRUG12, October 2008" which is incorporated by reference herein. Aspects relevant to embodiments of the current invention will be described in more detail below.

As mentioned with regard to FIG. 2, the AIF interface 208 consists of six independent antenna stream links 210. For the purpose of the embodiment described herein, each of these links is treated as a different point-to-point connection that is initialized and used in its own context. This allows various topologies to be created. For example, in a system with two nodes, such as exemplary nodes 300 and 302, point-to-point communication is performed via link 310 using the data burst mechanism over an antenna stream mechanism as described above.

In a system with three or more nodes, such as exemplary nodes 300, 302 and 304, Node 300 may perform point-to-multipoint data burst communication over antenna stream links 310 and 311 to Nodes 302 and 304 respectively, for example. Furthermore, more than one link may be configured between two nodes, such as link set 312 between nodes 300 and 304, in order to increase available bandwidth. The data descriptor sent in the first channel of link 311 is also used to transfer payload data from all of the links in link set 312.

Figure 4:
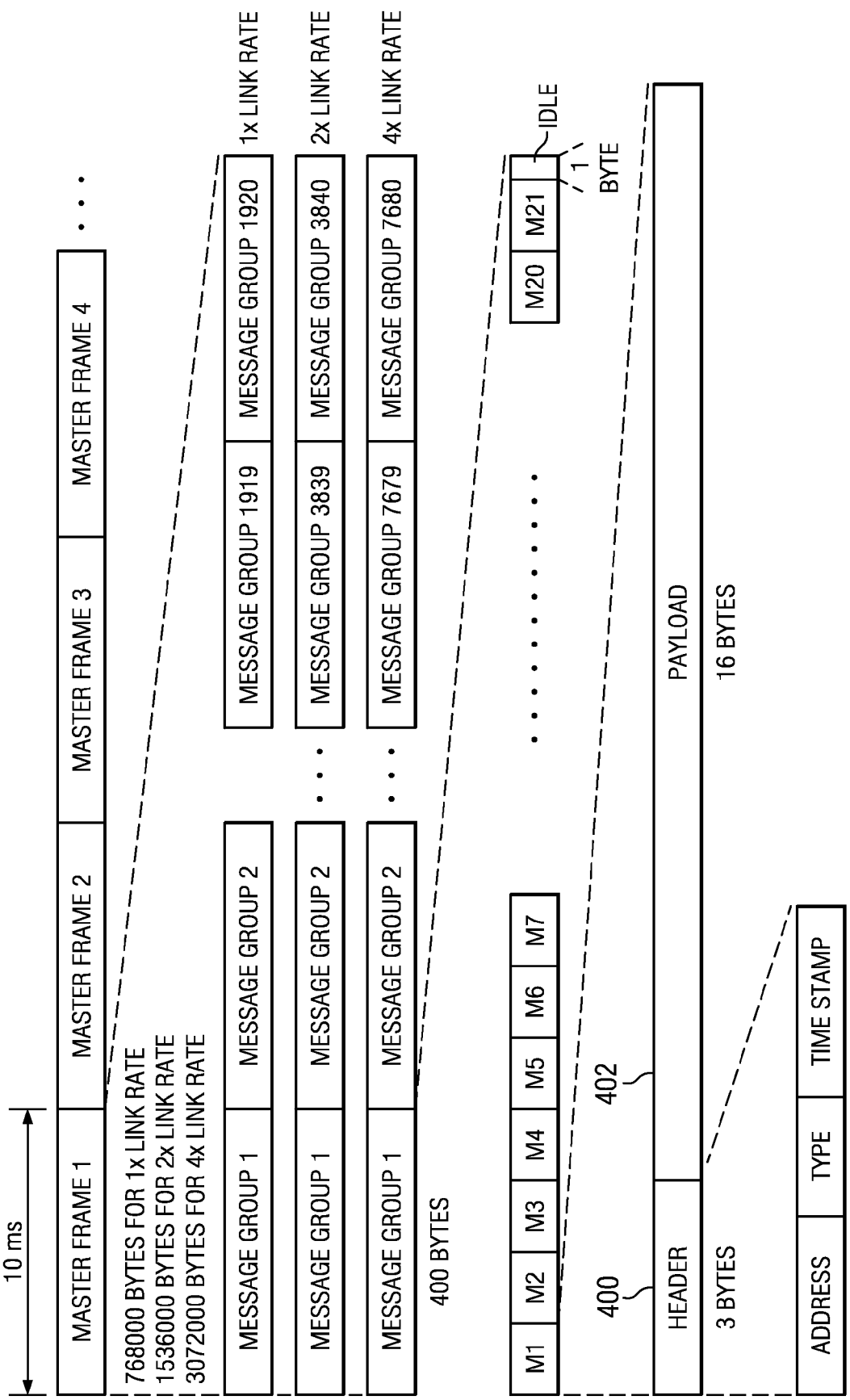
FIG. 4 is an illustration of an OBSAI RP3 protocol packet structure that is used on the constant data rate channels of the systems of FIGS. 1-3.

FIG. 4 is an illustration of an Open Base Station Architecture Initiative Reference Point 3 (OBSAI RP3) protocol packet structure that is used on the constant data rate antenna channels 210, 310, 312 as discussed above. The frame structure in OBSAI is based on a 10 msec master frame which consists of n×768000 bytes of payload, where n is the link rate with n=1, 2 or 4. The master frame is split into message groups, where the number of message groups per master frame also depends on the physical link rate. Each message group consists of 21 messages, denoted M1, M2, ..., M21. Each message consists of 16 bytes of payload and 3 bytes of descriptor. The message is constructed as an RP3 packet 400.

A time stamp 402 is embedded into each OBSAI message and is used to make sure that the transmitter and the receiver are synchronized. This is important for antenna data because each antenna sample needs to be traced back to a particular location in the UMTS (Universal Mobile Telecommunications System) frame hierarchy. The time stamp is set to 0 at each frame boundary. In UMTS systems, the frame duration is 10 msec, and the smallest unit of time is 1 chip period, which is 1/3.84 Mhz=260.4 nsec. The time stamp increments once every 4 chip periods, which translates to ~1.04 usec. The incrementing is done based on counting external clock pulses.

In digital communications, a "chip" is a pulse of a direct-sequence spread spectrum (DSSS) code, such as a pseudo-noise code sequence used in direct-sequence code division multiple access (CDMA) channel access techniques. In a binary direct-sequence system, each chip is typically a rectangular pulse of +1 or −1 amplitude, which is multiplied by a data sequence (similarly +1 or −1 representing the message bits) and by a carrier waveform to make the transmitted signal. The chips are therefore just the bit sequence out of the code generator; they are called chips to avoid confusing them with message bits. Payload data 404 in each message is 128 bits (16 bytes). For antenna data, payload data 404 includes four chips, each having sixteen bits of I and Q data.

The time stamp is generated and inserted into the message header by AIF transmit hardware. It is also accessible to software executing on the DSP cores via a read-only register. The time stamp is verified by AIF receive hardware. If the time stamp value contained in the message received from the SerDes link differs from the local time stamp (which is based on the local FSYNC counter), the message is discarded. If the received and the local time stamp are equal, the AIF hardware places the message in the location in the AIF receive buffer (AIF RX RAM) which corresponds to the time stamp.

The AIF can transfer packet-switched (PS) messages typically used for control, or circuit switched (CS) messages typically used for antenna samples. The OBSAI messages are organized into message groups which contain both data slots and at least one control slot. For example, for a 1× link rate there are twenty-one times slots. Twenty of those time slots are used for data messages, and one is used for a control message.

Packet-switched messages can be sent both through data slots and control slots, however, CS messages can only be transferred through the data slots. This is configured by software via a look-up table. The two types of messages are therefore time-division multiplexed on the SerDes bus, and the above mentioned look up table is used by hardware to decide at which point in time it needs to insert a packet switched message from the packet buffer, vs. a circuit-switched message which comes from the data buffer (AIF TX RAM).

Figure 5:
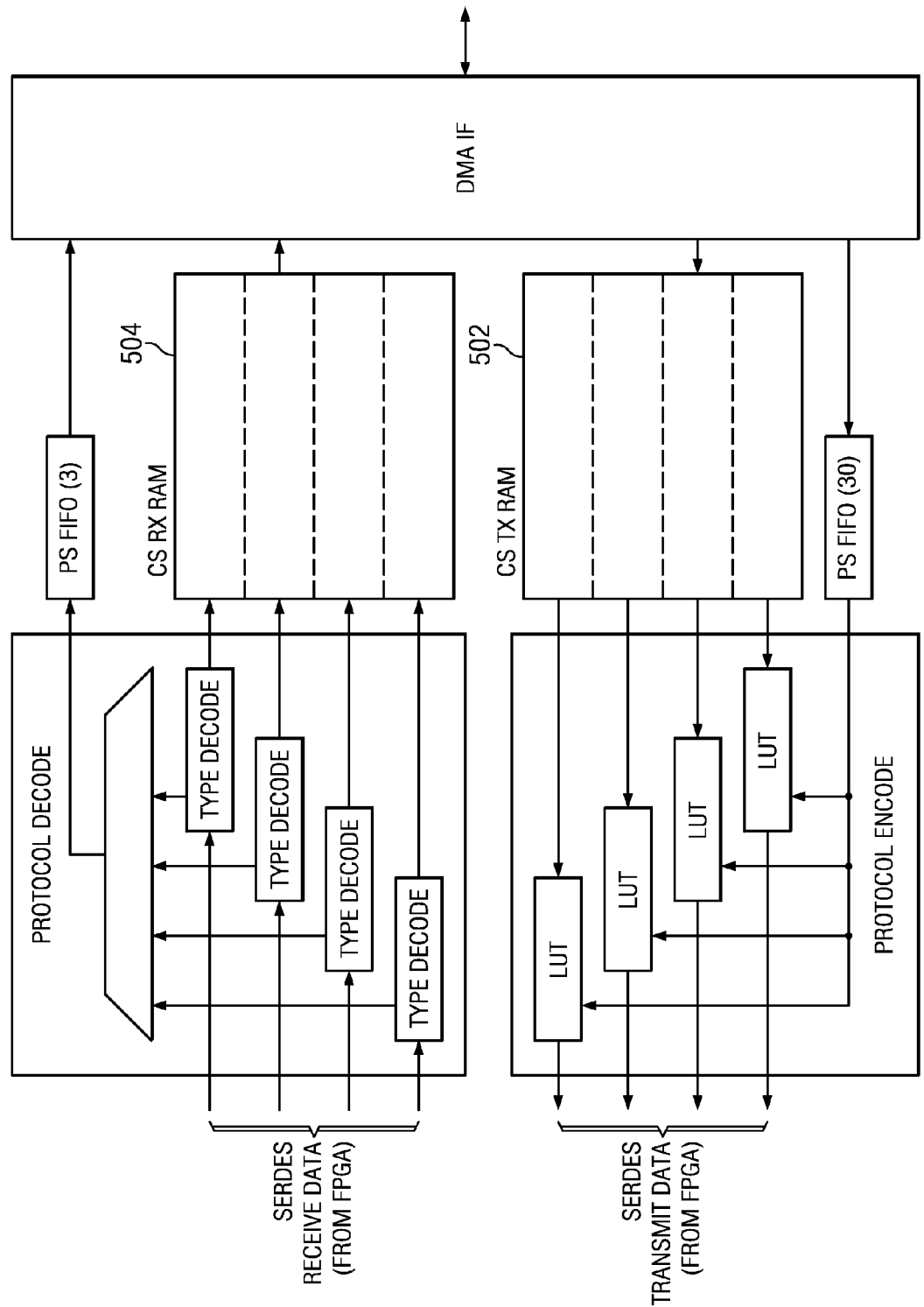
FIG. 5 is a block diagram of a portion of an antenna interface.

FIG. 5 is a block diagram of a portion of an antenna interface, such as AIF 208, used in the systems of FIG. 2, and similarly in FIG. 3. There may be multiple FIFOs within each antenna interface which are used for buffering of packet-switched messages: in this embodiment there are three receive FIFOs for incoming messages, and thirty transmit FIFOs for outgoing messages. The FIFOs can be programmed to generate an event (CPU or DMA sync) to inform the CPU or DMA engine when a certain number of packets has left/entered the FIFO.

On transmit, the DMA 220 or CPU 202-204 places the control message in the transmit FIFO. It is sent out on the next opportunity (i.e. the next slot configured for a PS message). CS messages are placed in transmit buffer 502 by DMA 220 and then sent out on the SerDes links.

On receive, each PS message (payload and header) is placed into RX FIFO and after a (programmable) number of messages have been received, an event is generated which can interrupt the CPU or trigger a DMA transfer. Each CS message received from the SerDes links are placed in receive buffer 504 and then moved to system memory using DMA 220.

Figure 6:
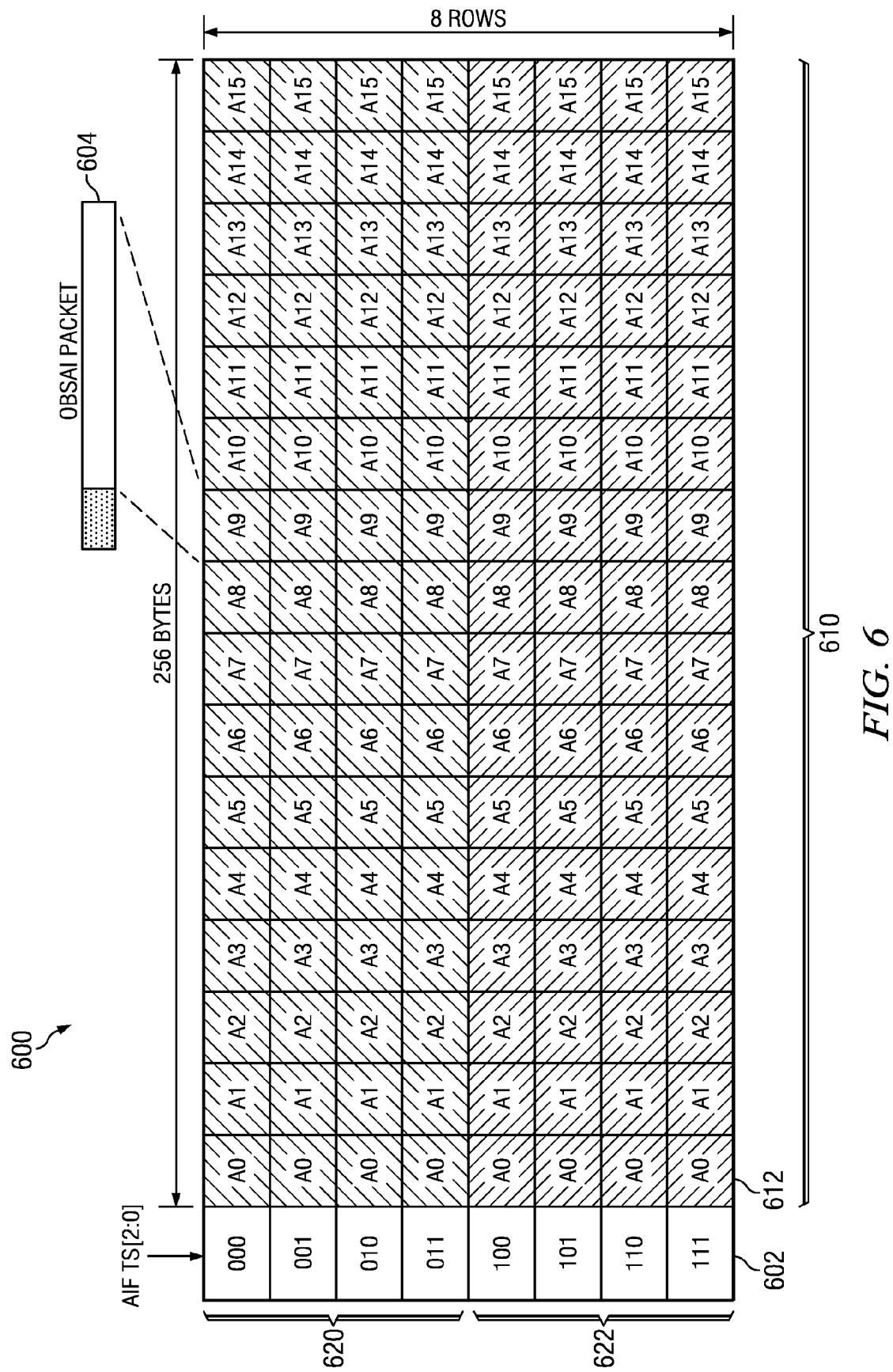
FIG. 6 is an illustration of an exemplary buffer area in memory that is used by either a transmitter or a receiver for the high speed channels of the systems of FIGS. 1-3.

FIG. 6 is an illustration of an exemplary buffer area 600 in memory within AIF 208 that is used by either a transmitter (TX) or a receiver (RX) for the constant data rate channels 210 of AIF 208. AIF TX and RX RAM 600 are used for circuit switched messages. The size of RAM 600 is 2 Kbytes per link, organized as eight rows of 256 bytes. Typically, these memories are accessed via DMA 220 to transfer transmit data into buffer 600 from system memory or to transfer received data from buffer 600 to system memory. On transmit, the AIF takes data from the TX RAM, inserts the header (including the time stamp) and transmits it over the SerDes 210. On receive, the AIF checks the received time stamp and then places the payload data of the message, such as message 604, at the appropriate place in the AIF RX RAM, according to timestamp index 602. Therefore, the location of data in the AIF RAMs is determined by the time stamp at which the data is to be sent or has been received.

From the point of view of AIF 208 and the SerDes link, the AIF RAMs 600 operate like circular buffers. On the receive side, the data is continuously being written into the RX RAM based on the time stamp, and on the transmit side, it is continuously being pulled out of TX RAM based on the time stamp. Therefore, the DSP side needs to be able to stay synchronized with the SerDes operation, i.e. the data needs to be written to the TX RAM at the same rate at which it is pulled out for SerDes transmission, and it needs to be pulled out of the RX RAM at the same rate at which it is being written to by SerDes. This is accomplished via synchronized DMA transfers. For each synchronization event, one time stamp worth of data (16 antenna streams, 16 bytes each) is transferred. Therefore, a synchronization event is used which is generated once per time stamp increment, or once every four chips. The role of the CPU is merely to setup the FSYNC and DMA prior to activating the AIF link, and (optionally) to respond to DMA transfer completion interrupts.

The synchronization events used by DMA 220 to synchronize accesses to the AIF RAMs between the DSP/DMA side and AIF/SerDes side are generated by the FSYNC module 212. In simplified terms, the FSYNC generates its events based on counting the FSYNC clock input pulses. The smallest transmission interval in the UMTS systems is one chip period, or 1/3.84 MHz. To allow for timing alignment and offset compensation between the transmitter and the receiver, the FSYNC module actually counts sub-chips (⅛th of chip duration).

As will be described in more detail with respect to FIG. 9, embodiments of the invention treat AIF buffers 600 as a ping-pong buffer. Data in ping buffer 620 is treated as one data structure, while data in pong buffer 622 is treated as a different data structure. During reception, while a set of data is being removed from ping buffer 620, another set may be received into pong buffer 622. Then, while the second set of data is being removed from pong buffer 622, a third set of data may be received into ping buffer 620. The ping-pong action is repeated for the length of each bursty transfer.

Figure 7:
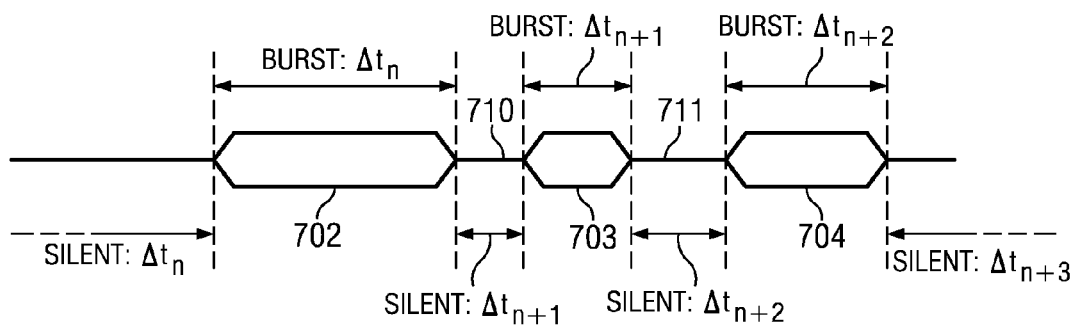
FIGS. 7 and 8 are illustrations of bursty transfers.
Figure 8:
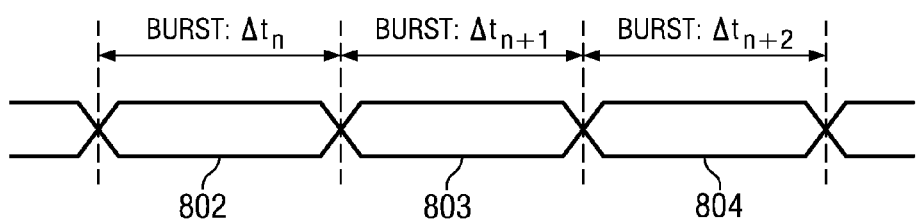

FIGS. 7 and 8 are illustrations of bursty transfers that may be performed over the synchronous data channels using an embodiment of the invention. FIG. 7 illustrates several data bursts 702-704 that are separated by silent periods 710, 711. Each data burst 702-704 may be a random, different length of time, Δt. Each silent period may be a random, different length of time, Δt. FIG. 8 illustrates several data bursts 802-804 that are adjacent with no silent periods between them. Each data burst 802-804 may be a random, same length of time, Δt.

As described above, OBSAI PS (packet switched) mode would be a natural candidate for inter-DSP communication, due to the availability of FIFO receive interrupts, but the bandwidth limitation to about 1-2 Gbps means that the AIF can only be utilized at a fraction of its capabilities. On the other hand, OBSAI CS mode is exactly the opposite of "bursty" and "asynchronous" communication: it is running continuously, and inserting bursty data into a continuously running stream of dummy data can potentially present high overhead: (1) The DMA needs to be emptying receive buffers (AIF RX RAM) continuously, and (2) the CPU in the receiving node needs to be checking the contents of received buffers continuously, and potentially discarding them most of the time.

Figure 9:
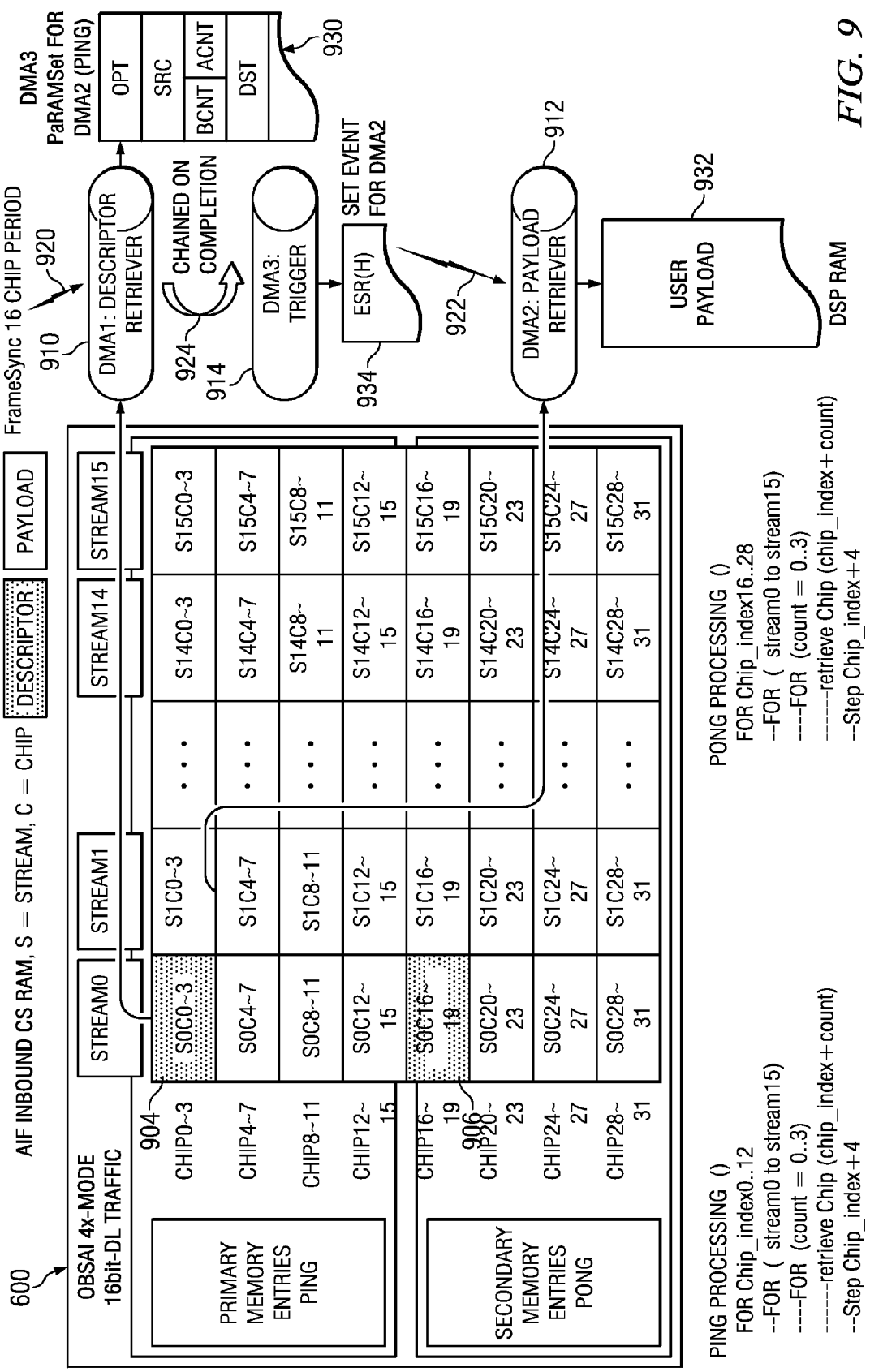
FIG. 9 is a flow diagram illustrating reception of bursty transfers over a synchronous data channel.

FIG. 9 is a flow diagram illustrating operation of bursty transfers over a synchronous data channel, such as AIF channels 210. An embodiment of the present invention uses OBSAI CS mode to transfer high speed data without loading down the receiving CPU to manage the receive buffers. This allows bursty data to be transferred over the synchronous OBSAI CS protocol with 95% or better bandwidth efficiency and with virtually no load on the CPU(s) of the receiving processing node.

While the traffic may be bi-directional, the highest difficulty involves the handling of the received data, because of the deviation that asynchronous bursty traffic represents versus the native synchronous dataflow. An embodiment of the invention may use one or more SOC devices, such as TMS320TC16488, TCI6487, C6474, TCI6616, C6670 or any unlisted devices equipped with AIF and EDMA3 compatible peripherals, available from Texas Instruments. These systems include an Enhanced Direct Memory Access (EDMA3) engine that is used to perform the asynchronous data transfers. A detailed description of the EDMA engine is provided in "TMS320C6474 DSP Enhanced DMA (EDMA3) Controller User Guide," Literature Number SPRUG11A, October 2008, revised January 2010, which is incorporated by reference herein. Aspects relevant to embodiments of the current invention will be described in more detail below. Other embodiments of the invention may use other types of DMA engines or DMA channels to perform data transfers as described herein.

Embodiments of the invention retain all genuine aspects of CPRI or OBSAI CS-Mode. AIF 208 supports up to six configurable links 210 each at a maximum rate of 3.072 Gbps (OBSAI) and 2.4576 Gbps (CPRI) in "4×" configuration. Each link is logically organized in streams (also called A×C-antenna carrier-) as illustrated in FIG. 6 and data is hosted in receiving FIFOS and transmitting FIFOS as illustrated in FIG. 5. The number of streams depends of the link rate and the traffic model. For the purpose of maximizing the bandwidth efficiency, and, in the spirit of simplicity, an embodiment described below specifies the bidirectional 16 bit downlink traffic model for each of the links. In this configuration, fifteen streams are available per link and 90 streams in total on the AIF. Each stream is then divided in 'chips' of 4 bytes each: the AIF transmits consecutively four chips of each stream in a synchronous manner.

The asynchronous transfer mechanism is overlaid on top of the synchronous behavior defined by either CPRI or OBSAI CS-Mode. When operating in the genuine CPRI or OBSAI modes the AIF always needs EDMA3 support to unload receiving FIFOS or to load transmitting FIFOs. The scheduling is based on the UMTS timings and event driven by the Frame Synchronization (FSYNC) peripheral, FSYNC 212 illustrated in FIG. 2, within the TMS320TC16488/TC16487/

C6474. To support asynchronous data flow, several DMA channels are linked together to perform asynchronous transfers.

Referring again to FIG. 9, each of the sixteen columns of the receive buffer 600 represents one of the sixteen streams in each link. The first chips (0 . . . 3) within the first stream for each link, stream 0 (S0), is dedicated to automatically configure the DMA engine in order to detect the presence of valid inbound traffic at the receiving device. As mentioned with regard to FIG. 6, receive buffer 600 is organized as two ping-pong buffers. When the first chip 904 in the ping buffer is received, a frame sync pulse is generated by FSYNC 212, according to the normal operation of ALF 208. Likewise, when the first chip 906 of the pong buffer is received, FSYNC 212 generates a frame sync pulse.

Referring again to FIG. 2, EDMA 220 has 256 Parameter RAM sets (PSETs) that contain configuration information about a transfer. Each PSET contains eight registers, as defined in Table 1. Table 2 illustrates how the parameter set (PaRAM set is arrayed in memory. Thus, in this embodiment, DMA engine 220 may be configured with up to 256 different DMA functions that may be linked using a link pointer in the twelfth register.

TABLE 1 parameter set

| | |
|---|---|
| 1 | Options (interrupt, chaining, sync mode, etc) |
| 2 | Source/(SRC) address |
| 3 | ACNT (Array counter, number of bytes in array) and BCNT (Frame counter, number of arrays in frame) |
| 4 | Destination (DST) address |
| | CCNT (block counter, number of frames in block) |
| | 4 source/destination (SRC/DST) Indexes |
| | BCNTRLD (BCNT-frames-reload for 3D transfers) |
| | LINK (pointer to another PSET) |

TABLE 2 layout of parameter set in memory

| PaRAM set | | Byte address offset |
|---|---|---|
| OPT | | +0h |
| SRC | | +4h |
| BCNT | ACNT | +8h |
| DST | | +Ch |
| DSTBIDX | SRCBIDX | +10h |
| BCNTRLD | LINK | +14h |
| DSTCIDX | SRCCIDX | +18h |
| Rsvd | CCNT | +1Ch |

As shown in Table 1 and Table 2, the first four words used for the EDMA configuration are organized in the following way: options, source address, ACNT (number of contiguous bytes in array) and BCNT (number of arrays in frame), and destination address. These values are written by the transmitter device in the first four chips 904 of the first stream of each link, indicated as stream zero, chips 0-3 (SOC0-3). This set of values is referred to herein as a data descriptor. A data descriptor 906 is also written into the first four chips (SOC16-19) of the next set of data that is received in the pong buffer. User payload data is then carried in the remaining area of the first stream and on the other streams. This pattern is repeated for the length of the data burst.

In the reception device, one of the Frame Synchronization signals derived from the FSYNC module triggers 920 a DMA transfer 910 from the AIF RAM buffer 600. This will be referred to as a first DMA function (DMA1). During the device initialization, the receiver CPU configures DMA1 to transfer the first four words of the first stream to a specific EDMA Parameter Set 930 used to configure the user payload DMA transfer. This second DMA function 912 will be referred to as DMA2. DMA1 is then linked with N blanking DMA transfers, where N is the ratio between the size of the AIF buffer and the size of four chips of 15 streams.

The chaining capability of the EDMA is then used to chain 924 a third DMA transfer (DMA3) 914 from DMA1. DMA3 is configured to write an appropriate bit into the Event Set Register (ESR) 934 to trigger (922) DMA2. DMA3 is used to avoid race conditions between completion of DMA1 and departure of DMA2.

Finally, if DMA2 PaRAMset 930 is not a dummy pattern then DMA2 is used to transfer 912 the user payload data from the AIF buffer RAM 600 to the receiver CPU buffer 932. CPU buffer 932 may be located in L2 memory, referring again to FIG. 2, or in external memory such as DDR2 memory illustrated in FIG. 3. The options field (OPT) in the first word of descriptor 930 that has been configured by the transmitter CPU indicates if an interrupt is generated on the receiver side upon completion. The ACNT and BCNT parameters instruct the number of bytes to be transferred to the receiver CPU RAM.

This scheme is repeated automatically using the linking capability of the EDMA. As a result, a specific number of bytes configured by the transmitter CPU can be sent to a memory buffer of the receiver CPU at very high speed without any intervention of the CPU in the reception side.

The only time that the receiving device gets interrupted is when the remote transmitting device sets the "transfer controller interrupt enable" bit in the "Options" configuration word written in the first chip of the first link in use. This will typically be used as a notification for end-of-transfer. The last data transferred before the interrupt is asserted to the receiving CPU/DSP software may also contain the relevant information about total size of data transmitted and location where the data have been stored in buffer 932.

In the absence of data to be transmitted, a specific "dummy" pattern is populated in the first four chips in the first stream for each of the links in use. The EDMA will keep cycling its mechanism as explained above for retrieving the "dummy" pattern in the PSET but will stay quiet on payload transfers since the "dummy" pattern will instruct that no data to be transferred. In this embodiment, a dummy transfer is indicated by a "0000" in the source and destination address of the data descriptor.

The transmitting device has the responsibility to populate the links to be used for data exchange. It also has to be aware of the system memory map, decided at the system initialization.

Devices such as the TMS320TCI6488/TCI6487/C6474, TCI6616, C6670 or any devices equipped with an AIF and a DMA engine that can perform chaining as described herein may implement both the receiving and the transmitting mechanism.

Some applications may require links to work separately. But may also be a case where a larger capacity is requested, and where several links are combined, as illustrated in FIG. 3, links 312. This use-case is also supported since it is possible to benefit from the synchronous aspect of the carrier protocol CPRI or OBSAI which also ensures that all the links are orchestrated from the same clock source. Therefore, it is possible to logically associate the streams (up to 90) and only populate the first stream in the row with the specific transfer instructions in a data descriptor. The DMA2 function in charge of the payload transfer in then hopping from payload streams in receiving FIFOS to next receiving FIFOS for next links-in-the-row for the number of links required to sustain the requested bandwidth. In this manner, several links can be combined into a virtual single link.

Figure 10:
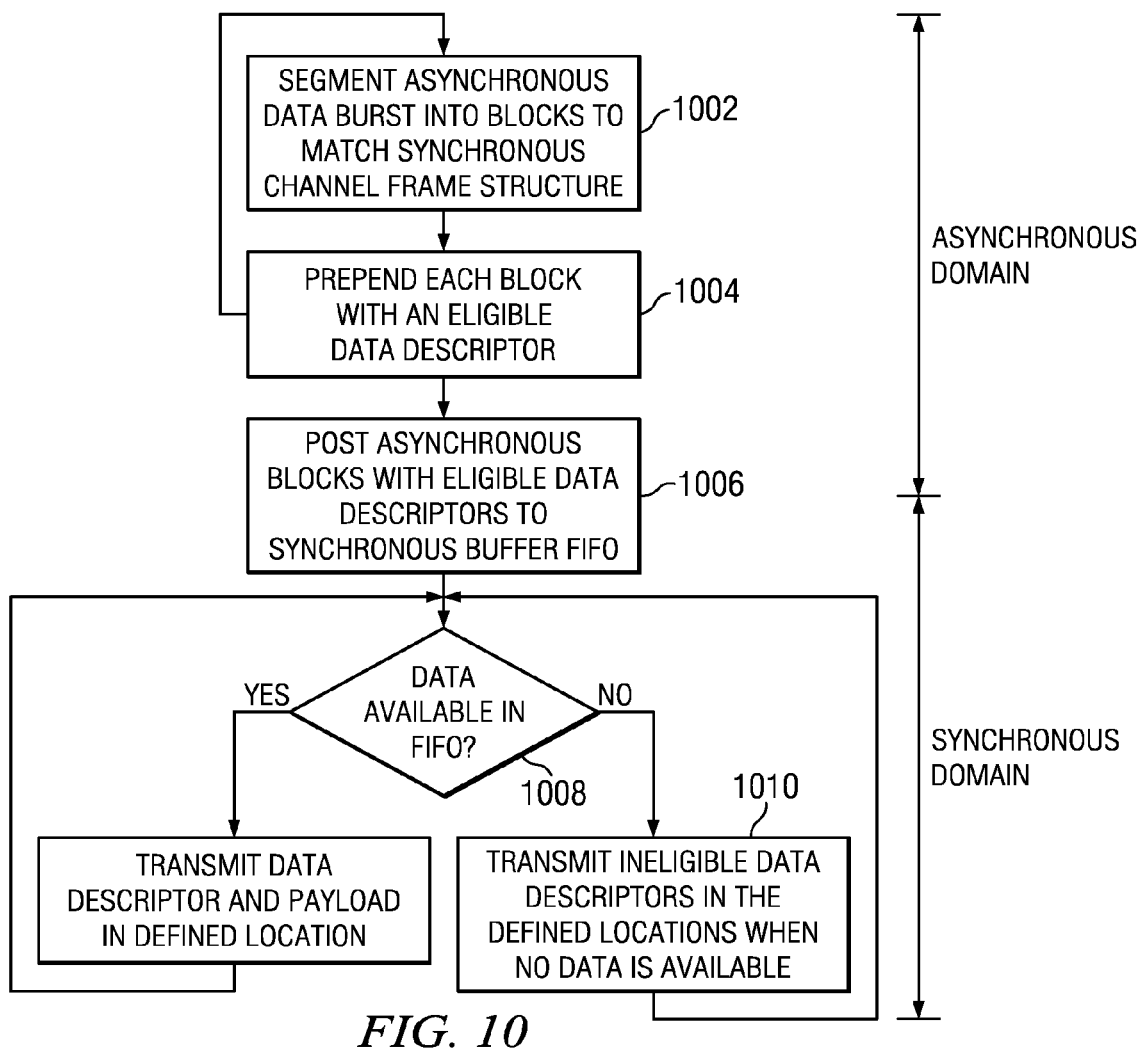
FIG. 10 is a flow diagram illustrating transmission of bursty transfers over a synchronous data channel.

FIG. 10 is a flow diagram illustrating transmission of bursty transfers over a set of one or more synchronous data channels that have a defined frame structure. In this embodiment of the invention, the synchronous data channel conforms to CPRI or OBSAI standards. As the transmitter receives each asynchronous data burst, it segments 1002 the asynchronous data burst into blocks of payload data matching a frame data structure size of the one or more synchronous data channels. In this embodiment, the blocks of payload data are sized to match the ping pong buffer of the receiver, as described with respect to FIG. 9.

The transmitter prepends 1004 each block of payload data with an eligible data descriptor. An eligible data descriptor is constructed to match a parameter set of a DMA function, as described with regard to Table 1 and Table 2 above. The source and destination addresses are determined by the transmitter to agree with the memory map of the receiver. The source and destination address of each data descriptor defines a DMA transfer that matches the length of the associated payload data segment. Once the entire burst of data is divided into blocks and transmitted, the send is completed and a new burst can be processed (1002-1004) by the user application.

In this embodiment, one of the CPU cores 202-206 executes a software application that determines how the bursts are segmented and prepares the data descriptors based on the memory map of the target receiver node.

The transmitter then transmits 1006 the asynchronous data burst with the prepended eligible data descriptors on the set of one or more synchronous data channel buffers. The eligible data descriptors are transmitted in a fixed location of each data structure of the set of one or more synchronous data channels. In this embodiment, the data descriptors are located in the first chip of channel zero, as described with regard to FIG. 9. The asynchronous data bursts are transmitted over SerDes links to a receiver node as illustrated in FIG. 3.

The options field (OPT) in the first word of the last data descriptor of a burst may be configured by the transmitter CPU to indicate if an interrupt is to be generated on the receiver side upon completion. The ACNT and BCNT parameters instruct the number of bytes to be transferred to the receiver CPU RAM If eligible data is available 1008 in the Buffer FIFO, it is transmitted with its descriptor and payload in the defined location. The polling of this buffer FIFO by the transmitter is done periodically and any data transmitted is flushed from the FIFO and replaced by an ineligible data descriptor until a new send is done using operations 1002-1004.

When no eligible data is available for transmission, then an ineligible data descriptor is transmitted 1010 in the fixed location of each data structure of the set of one or more synchronous data channels. An ineligible data descriptor indicates no data is available and configures the receiver DMA to perform a null transfer. In this embodiment, a null transfer is indicated by a "0000" in the source and destination address of the data descriptor.

Other Embodiments

Various other embodiments of the invention will be apparent to persons skilled in the art upon reference to this description. Embodiments of the invention are by no means restricted to the particular SOC described in some detail herein. DMA functions having different schemes for triggering and/or linking may be used with reference to the general techniques described herein.

While synchronous data channels conforming to CPRI or OBSAI standards have been described herein, embodiments of the invention are not limited to these two standards. For example, an embodiment may be based upon other types of constant data rate communication links which provide a frame structure in which a data descriptor may be embedded at a known location in the frame structure as part of a continuous stream of data. In another embodiment, a synchronous data channel that includes any suitable way to embed data descriptors at defined locations within the data stream may be used.

In another embodiment, the constant data rate communication link may be serial, parallel, hardwired, optic, radio or other means for transferring a continuous stream of data.

The term "circuit switched" does not require actual switching of the circuit. It merely implies that a given communication link is connected, at least for a period of time, between two nodes for the purpose of transmitting a continuous stream of data.

As used herein, the terms "applied," "coupled," "connected," and "connection" mean electrically connected, including where additional elements may be in the electrical connection path. "Associated" means a controlling relationship, such as a memory resource that is controlled by an associated port. While the invention has been described with reference to illustrative embodiments, this description is not intended to be construed in a limiting sense.

It is therefore contemplated that the appended claims will cover any such modifications of the embodiments as fall within the true scope and spirit of the invention.

What is claimed is:

1. A method for receiving an asynchronous data burst on one or more synchronous data channels, the method comprising:
    receiving a data channel having a defined frame structure with one or more data structures, wherein each data structure comprises a plurality of data locations;
    selecting data from a fixed data location in each data structure as a data descriptor for each respective data structure;
    configuring a direct memory access (DMA) function using each data descriptor;
    for each data structure, transferring a block of payload data from the data channel to a memory buffer using the DMA function when the data descriptor associated with the data structure is an eligible data descriptor that indicates the block of payload data is present, otherwise performing a dummy DMA transfer when the data descriptor is an ineligible data descriptor that indicates no payload data is present in the associated data structure.

2. The method of claim 1, wherein selecting the data descriptor from each data structure is performed by a first DMA function that is configured to transfer each data descriptor from the fixed location in each data structure of the data channel to a parameter storage location, and wherein a second DMA function is configured from the parameter storage location to transfer each block of payload data.

3. The method of claim 2, wherein the second DMA function is triggered by a third DMA function that is configured to transfer a trigger word from a memory storage location to a control location for the second DMA function.

4. The method of claim 2, wherein the third DMA function is chained to the first DMA function, such the third DMA function is triggered each time the first DMA function completes transferring each data descriptor.

5. The method of claim 1, wherein the DMA function is coupled to a central processing unit (CPU), further comprising notifying the CPU only when the entire asynchronous data burst has been received.

6. The method of claim 5, wherein the CPU does not participate in receiving the asynchronous data burst until being notified that the entire asynchronous data burst has been received, whereby processing capacity of the CPU is not reduced by receiving the asynchronous data burst.

7. The method of claim 1, wherein a block of payload data is transferred from two or more synchronous data channels using the DMA channel in response to a data descriptor located in only one of the two more synchronous data channels.

8. The method of claim 1, wherein the one or more synchronous data channels conform to OBSAI RP3 protocol.

9. A method for transmitting an asynchronous data burst on a set of one or more synchronous data channels having a defined frame structure, the method comprising:
  segmenting the asynchronous data burst into blocks of payload data matching a data structure data structure size of the one or more synchronous data channels;
  prepending each block of payload data with an eligible data descriptor;
  transmitting the asynchronous data burst with the prepended eligible data descriptors on the set of one or more synchronous data channels, wherein the eligible data descriptors are transmitted in a fixed location of each data structure of the set of one or more synchronous data channels; and
  transmitting an ineligible data descriptor in the fixed location of each data structure of the set of one or more synchronous data channels when asynchronous data is not available.

10. A digital system comprising:
  a first synchronous channel interface configured to receive a set of one or more data channels having a defined frame structure, wherein each frame comprises one or more data structures each having a plurality of data locations;
  a direct memory access (DMA) function coupled to the synchronous channel interface, wherein the DMA function is configured to perform linked transfers;
  a first memory circuit coupled to DMA function for receiving a data burst;
  wherein the DMA function is configured to select data from a fixed data location in each data structure as a data descriptor for each respective data structure, and to configure another DMA transfer using each data descriptor, such that for each data structure, a block of payload data is transferred from the data channel to the memory circuit using the DMA function when the data descriptor associated with the data structure is an eligible data descriptor that indicates the block of payload data is present, otherwise performing a dummy DMA transfer when the data descriptor is an ineligible data descriptor that indicates no payload data is present in the associated data structure.

11. The digital system of claim 10, further comprising:
  a second synchronous channel interface coupled to the first synchronous channel interface, the second synchronous channel interface configured to transmit on the set of one or more data channels having a defined frame structure;
  a processing unit (CPU) coupled to the second asynchronous channel interface, wherein the CPU is configured to segment an asynchronous data burst into blocks of payload data matching a frame data structure size of the one or more synchronous data channels, and prepend each block of payload data with an eligible data descriptor;
  wherein the second synchronous channel interface is operable to transmit the asynchronous data burst with the prepended eligible data descriptors on the set of one or more synchronous data channels, wherein the eligible data descriptors are transmitted in a fixed location of each data structure of the set of one or more synchronous data channels; and
  wherein the second synchronous channel is operable to transmit an ineligible data descriptor in the fixed location of each data structure of the set of one or more synchronous data channels when asynchronous data is not available.

* * * * *